US007228280B1

(12) United States Patent
Scherf et al.

(10) Patent No.: US 7,228,280 B1
(45) Date of Patent: Jun. 5, 2007

(54) FINDING DATABASE MATCH FOR FILE BASED ON FILE CHARACTERISTICS

(75) Inventors: Steven D. Scherf, Fremont, CA (US); Paul E. Quinn, Kensington, CA (US)

(73) Assignee: Gracenote, Inc., Emeryville, CA (US)

( * ) Notice: Subject to any disclaimer, the term of this patent is extended or adjusted under 35 U.S.C. 154(b) by 707 days.

(21) Appl. No.: 09/621,619

(22) Filed: Jul. 21, 2000

Related U.S. Application Data

(60) Continuation-in-part of application No. 09/354,164, filed on Jul. 16, 1999, now Pat. No. 6,240,459, which is a division of application No. 08/838,082, filed on Apr. 15, 1997, now Pat. No. 5,987,525.

(51) Int. Cl.
*G10L 19/00* (2006.01)

(52) U.S. Cl. .................. 704/500; 704/201; 705/26; 705/51; 705/59; 705/75; 705/76; 707/3; 707/10; 709/217; 709/232; 709/236; 715/500.1

(58) Field of Classification Search .......... 704/231, 704/232, 234, 243, 236, 239, 268, 500–504, 704/201; 705/28, 26, 51, 59, 75, 76, 25; 725/22; 709/248, 217, 232, 236; 700/234; 386/46; 707/3, 10; 715/500.1
See application file for complete search history.

(56) References Cited

U.S. PATENT DOCUMENTS

| 4,415,767 A | * | 11/1983 | Gill et al. .................. 704/243 |
| 4,450,531 A | * | 5/1984 | Kenyon et al. .............. 708/5 |
| 4,677,466 A | * | 6/1987 | Lert et al. .................. 725/22 |
| 5,250,745 A | | 10/1993 | Tsumura |
| 5,262,940 A | * | 11/1993 | Sussman .................... 705/28 |
| 5,347,083 A | | 9/1994 | Suzuki et al. |
| 5,510,572 A | | 4/1996 | Hayashi et al. |

(Continued)

FOREIGN PATENT DOCUMENTS

EP        731 466        9/1996

(Continued)

OTHER PUBLICATIONS

Pfeiffer et al ("Automatic Audio Content Analysis", 4th ACM International Conference on Multimedia, Feb. 1997).*

(Continued)

*Primary Examiner*—Vijay Chawan
(74) *Attorney, Agent, or Firm*—Staas & Halsey LLP

(57) ABSTRACT

A signature array of digitally sampled audio is formed from segment(s) of the digitally sampled audio by counting the number of occurrences within the segment(s) in each of a plurality of value bands or slots, such as amplitude bands. The signature array undergoes a fuzzy comparison with signatures arrays in the database. If more than one potential match is found, a more precise comparison is made. In the case of compact discs (CDs), five second sample segments may taken from the beginning, middle and end of each track to detect, e.g., the amplitude of the digitally sampled audio on the CD. A CD signature array may be formed of approximately 2000 value bands or slots by accumulating the occurrence of signals within each slot for all of the sample segments of the CD.

48 Claims, 4 Drawing Sheets

U.S. PATENT DOCUMENTS

| | | | |
|---|---|---|---|
| 5,536,902 A | | 7/1996 | Serra et al. |
| 5,539,635 A | * | 7/1996 | Larson, Jr. .................. 700/234 |
| 5,581,658 A | * | 12/1996 | O'Hagan et al. ........... 704/232 |
| 5,616,876 A | | 4/1997 | Cluts |
| 5,671,330 A | * | 9/1997 | Sakamoto et al. .......... 704/268 |
| 5,693,903 A | | 12/1997 | Heidom et al. |
| 5,756,918 A | | 5/1998 | Funaki |
| 5,763,802 A | | 6/1998 | Aoki et al. |
| 5,806,024 A | | 9/1998 | Ozawa |
| 5,874,686 A | | 2/1999 | Ghias et al. |
| 5,918,223 A | * | 6/1999 | Blum et al. ..................... 707/1 |
| 5,983,176 A | | 11/1999 | Hoffert et al. |
| 5,987,525 A | * | 11/1999 | Roberts et al. ............. 709/248 |
| 6,061,680 A | * | 5/2000 | Scherf et al. .................. 707/3 |
| 6,141,637 A | | 10/2000 | Kondo |
| 6,201,176 B1 | | 3/2001 | Yourlo |
| 6,230,207 B1 | * | 5/2001 | Roberts et al. ............. 709/236 |
| 6,297,439 B1 | | 10/2001 | Browne |
| 6,404,977 B1 | * | 6/2002 | Iggulden ..................... 386/46 |
| 6,498,955 B1 | | 12/2002 | McCarthy et al. |
| 6,539,395 B1 | | 3/2003 | Gjerdingen et al. |
| 6,611,812 B2 | * | 8/2003 | Hurtado et al. ............... 705/26 |

FOREIGN PATENT DOCUMENTS

| | | | |
|---|---|---|---|
| JP | | 03-240100 | * 10/1991 |

OTHER PUBLICATIONS

McNab et al ("Towards the Digital Music Library: Tune Retrieval From Acoustic Input", Proceedings of the 1st ACM internationa conference on Digital libraries, Apr. 1996).*

Pfeiffer et al., "Automatic Audio Content Analysis", Proceedings of the ACM Multimedia 96 Nov. 18-22, 1996, pp. 21-30.

T. Berners-Lee et al., Hypertext Transfer Protocol—HTTP/1.0 (Internet Request for Comments No. 1945), 1996, pp. 1-60.

J. Oikarinen et al., Internet Relay Chat Protocol, (Internet Request for Comments No. 1459), 1993, pp. 1-65.

Dougals E. Comer, Internetworking with TCP/IP, (3rd Edition, 1995, vol. 1, Principles, Protocols, and Architecture, pp. 59-88.

Douglas E. Comer et al., Internetworking with TCP/IP, (3rd Edition, 1995, vol. II, Design, Implementation, and Internals, pp. 1-660.

Douglas E. Comer et al., Internetworking with TCP/IP, (BSD Socket Version) vol. III, Client-Server Programming and Applications, pp. 1-498.

December et al., HTML 3.2 and CGI Unleashed, 1996, pp. iii-xxxi.

J. Foote et al., "Content-Based Retrieval of Music and Audio", Pro-ceedings of the SPIE, vol. 3229, Nov. 3, 1998, pp. 138-147.

Wold et al., "Content-Based Classification, Search and Retrieval of Audio", IEEE Multimedia, IEEE Computer Society, vol. 3, No. 3, 1996, pp. 27-36.

Gibson, David, "Name That Clip: Content-based music retrieval", Presentation at SIGIR 1999 Workshop on Music Information Retrieval, accessed at bab5.org/~dag/cs/NameThatClip/ on Aug. 5, 2004.

Uitdenbogerd et al., Manipulation of Music for Melody Matching; Department of Computer Science, ACM Multimedia '98, pp. 235-240.

Tseng, Content-Based Retrieval for Music Collections; SIGIR '99, pp. 176-182.

* cited by examiner

FINDING DATABASE MATCH FOR FILE BASED ON FILE CHARACTERISTICS

CROSS-REFERENCE TO RELATED APPLICATIONS

This is a continuation-in-part of U.S. patent application Ser. No. 09/354,164 filed Jul. 16, 1999 now U.S. Pat. No. 6,240,459, which is a divisional of U.S. patent application Ser. No. 08/838,082 filed Apr. 15, 1997, incorporated herein by reference, which issued Nov. 16, 1999 as U.S. Pat. No. 5,987,525.

BACKGROUND OF THE INVENTION

1. Field of the Invention

The present invention is directed to locating records in a database and, more particularly, to locating a match for a waveform in a database of records representing waveforms.

2. Description of the Related Art

Over the past few years, on-line services have experienced explosive growth and have become a major new form of entertainment. Alongside this new entertainment, more traditional forms such as musical recordings have continued to be consumed on a massive scale.

The traditional experience of the musical recording is listening by a small group of persons gathered together in a room. The music fills the room acoustically, but there is little associated visual content, and there is only a limited interaction with the recording, consisting essentially of deciding which tracks to play and performing simple transformations on the recorded sound, such as setting the volume or applying an audio equalizer. This traditional experience dates back to the early age of 78 r.p.m. musical recordings almost a century ago.

The traditional production of a musical recording complements the traditional experience of the recording. The recording is produced in a number of recording sessions, subject to careful mixing and editing, and then released to the public. At that point, the recording is in a fixed form, nowadays an audio CD, whose purpose is to record as faithfully as possible the final sonic experience designed by its authors, the musicians, producer, and recording engineers.

Music videos have supplemented the traditional experience of musical recordings by allowing the association of visual content with tracks of such a recording. In practice, however, music videos have been broadcast, with all the problems of lack of user control which that implies, and they have not contributed to interactivity or participation by the consumer.

On-line services offer opportunities for enriching the experience associated with musical recordings. The present invention is addressed to computer programs, systems, and protocols which can fulfil this promise.

SUMMARY OF THE INVENTION

It is therefore an object of this invention to provide computer programs, systems, and protocols which allow producers to deliver entertainment complementary to musical recordings by means of on-line services such as the Internet. It is a further object of this invention to provide computer programs, systems, and protocols which allow such complementary entertainment to be meaningfully interactive for the consumer, such that the consumer can also be a creator of the experience.

It is a further object of the invention to achieve the foregoing objects by means of implementations designed to attain integration with existing environments and programs, particularly on the Internet, while retaining the flexibility to adapt to the continuing evolution of standards for on-line services.

In one aspect of the invention, software is provided which permits a computer program running on a remote host to control a compact disc (CD) player, DVD player, or the like on a user's computer. (For convenience, we use the term "CD player" to refer also to DVD players and similar devices.) The software is designed to permit the remote host both to initiate actions on the CD player and to become aware of actions which the user has initiated by other control means, such as the buttons on the CD player's front panel or a different CD player control program. This aspect of the invention is a building-block for the provision of complementary entertainment for musical recordings when those recordings are fixed in the prevailing contemporary form, the audio CD.

In a second aspect of the invention, visual content, including interactive content, may be delivered over an on-line service in such a way that it is synchronized to the delivery of content from a musical recording. Such visual content may, for example, be synchronized to the playing of an audio CD in the user's computer. The visual content is thematically linked to the musical recording, for example in the manner of a music video.

In a third aspect of the invention, a method is provided for assigning a unique identifier to musical recordings consisting of a number of tracks. A unique identifier is a useful complement to the delivery of visual content in conjunction with the playing of an audio CD in that it allows the software which delivers the visual content to be sure that the audio CD is in fact the correct CD to which the visual content corresponds. If the visual content is designed, for example, to accompany the Rosary Sonatas of Heinrich Ignaz Franz Biber, it would presumably not function well if the CD in the user's player were the soundtrack for the film Mary Poppins. The unique identifier also allows a CD to be used as a key to access a premium Web area. Furthermore, the unique identifier can allow the user to be directed to an area of the Web corresponding to the CD which is in the user's machine.

In a fourth aspect of the invention, the immensely popular on-line service generally referred to as a "chat room" may be enhanced by means of a link to a musical recording to which all persons in the room are listening. The chat room experience as it exists today in on-line services has a disembodied quality by comparison with traditional face-to-face social encounters, in which there are identifiable surroundings. The only common experience to the chat users today are the words of the chat as they fly by on a computer screen, and perhaps the user icons ("avatars") or other visual content occupying a small space on the screen. The use of a musical recording in conjunction with a chat room opens up the possibility of restoring to the experience a degree of the shared ambience of traditional social encounters. Furthermore, the musical recording offers a focal point that allows chat-seekers to group together by means of shared interests in a particular type of recording.

DESCRIPTION OF PREFERRED EMBODIMENTS

The preferred embodiment of this invention operates on the World Wide Web. The software implementation environment provided by the World Wide Web is described in a number of books, for example, John December & Mark Ginsburg, HTML 3.2 and CGI Unleashed (1996). The World Wide Web is based on a network protocol called HTTP (hypertext transfer protocol), which is described in T. Berners-Lee et al., Hypertext Transfer Protocol—HTTP/1.0 (Internet Request for Comments No. 1945, 1996). The HTTP protocol must be run atop a general connection-oriented protocol, which today is generally TCP/IP, described in Douglas E. Corner, Internetworking with TCP/IP (3d ed. 1995). However, the invention described here is not limited to HTTP running over any particular kind of network software or hardware. The principles of the invention apply to other protocols for access to remote information that may come to compete with or supplant HTTP.

Figure 1:
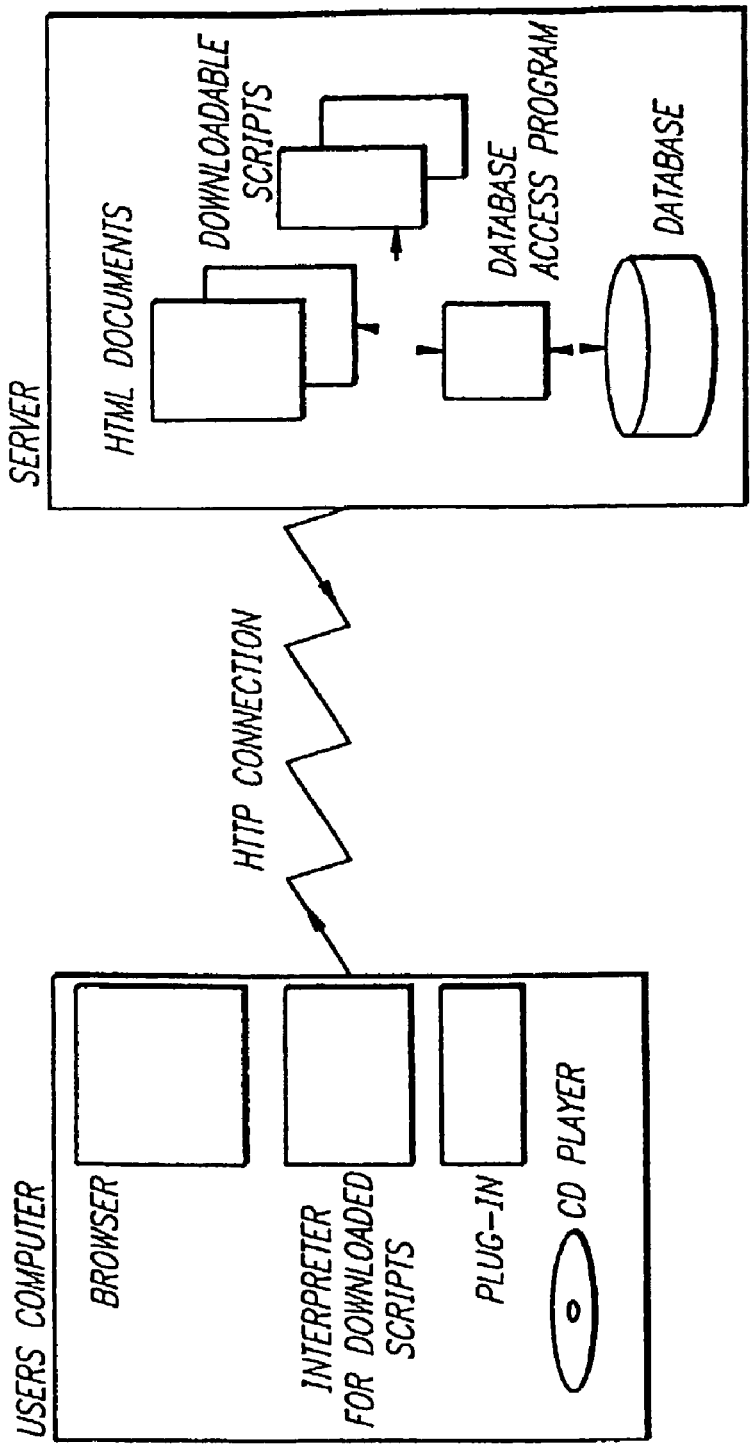
FIG. 1 is a block diagram of the environment in which the preferred embodiment operates.

As shown in FIG. 1, a Web user sits at his or her computer and runs a computer program called a browser. The browser sends out HTTP requests to other computers, referred to as servers. In requests, particular items of data, referred to as resources, which are available on servers, are referred to by means of uniform resource locators (URL's), character strings in a particular format defined in Berners-Lee et al., supra. A URL includes both an identification of the server and an identification of a particular item of data within the server. Reacting to the requests, the servers return responses to the user's browser, and the browser acts upon those responses, generally by displaying some sort of content to the user.

The content portion of the responses can be a "Web page," expressed in the hypertext markup language (HTML). That language allows one to express content consisting of text interspersed with bitmap-format images and links (also known as anchors and hyperlinks). The links are further URL's to which the browser may, at the user's prompting, send further requests.

The responses can also include more complex commands to be interpreted by the browser, e.g., commands which result in an animation. HTML itself does not define complex commands, but rather they are considered to belong to separately-defined scripting languages, of which the two most common ones are JavaScript and VBScript.

In addition to extending the function of the browser by means of code written in a scripting language, it is also possible to extend the function of a browser with compiled code. Such compiled code is referred to as a "plug-in." The precise protocol for writing a plug-in is dependent on the particular browser. Plug-ins for the Microsoft browser are referred to by the name of ActiveX controls.

Plug-ins may be very complex. A plug-in which may advantageously be used in connection with the invention is Shockwave from Macromedia. It permits animations which are part of a server response to be downloaded and played to the user. Shockwave defines its own scripting language called Lingo. Lingo scripts are contained within the downloadable animations which the Shockwave plug-in can play.

The general format of a Shockwave animation is a timeline consisting of a series of frames, together with a number of visual objects which appear, perform motions, and disappear at particular frames within the timeline. To achieve more complex effects within a Shockwave animation, Lingo scripts may be invoked in addition to predefined visual objects.

A preferred embodiment of the invention employs a plug-in, referred to as the command plug-in, which provides to a scripting language the ability to command in a detailed fashion the playing of a musical recording. The command plug-in should provide, at a minimum, the following basic functions:

(1) Start and stop play.

(2) Get current track and position within the track.

(3) Seek to a track and a position within the track.

(4) Get and set volume.

(5) Get information regarding the CD (e.g., the number of tracks, their lengths, the pauses between tracks).

(6) Get information regarding the capabilities of the CD drive.

Other functions may be provided, limited only by what the underlying operating system services are able to provide.

The command plug-in is preferably written in a conventional programming language such as C++. The plug-in must conform to the existing standards for plug-ins, such as those required of Microsoft ActiveX objects. In order to obtain the information and carry out the functions which the command plug-in makes available to the scripting language, the command plug-in relies on functions which provide control and information regarding the playing musical recording. These functions will depend on the precise source of the recording. If, as in the currently preferred embodiment, the recording is being played on an audio CD in the computer CD player, and if the browser is running under Microsoft Windows 3.1 or Windows 95, these functions would be the MCI functions, which form a part of the Win32 application programming interface. These functions are documented, for example, in Microsoft Win32 Programmer's Reference. Different functions may be provided by streaming audio receivers, as for example receivers which capture audio which is coming into the user's computer over a network connection in a suitable audio encoding format such as MPEG.

An important point to note about the implementation of the command plug-in is that the operations which it carries out, as for example seeks, may take times on the order of a second. It is undesirable for the command-plug in to retain control of the machine during that interval, so it is important that the plug-in relinquish control of the machine to the browser whenever a lengthy operation is undertaken, and report on the results of the operation via the asynchronous event handling capability used in the common scripting languages.

Given the above summary of the functions which the command plug-in provides, a general knowledge of how to write plug-ins (e.g., of how to write ActiveX objects), and a knowledge of the relevant application programming interface for controlling the play of the musical recording (e.g., MCI in Win32), a person skilled in the art could readily and without undue experimentation develop an actual working command plug-in. For this reason, further details of how the command plug-in is implemented are not provided here.

The existence of a command plug-in providing the functions listed above to a scripting language is a foundation on which entertainment complementary to a musical recording may be constructed. In particular, it is possible to devise, building on this foundation, a method for synchronizing the display of visual content by means of the scripting language with the events which are occurring on the audio CD.

In a preferred embodiment of the invention, the synchronization of the visual content to the audio CD proceeds as follows. The visual content is provided by means of a Shockwave animation, which is downloaded from the server and displayed for the user by means of a Shockwave plug-in. This downloading may take place before the animation is displayed, or alternatively it may take place as the animation is being displayed, provided the user's connection to the network is fast enough to support download at an appropriate speed. The downloading is a function provided by the Shockwave plug-in itself.

As the Shockwave animation is played, a Lingo script executes each time a frame finishes displaying. The Lingo script contains a description of the relationship which should exist between frames of the animation and segments of the musical recording, identified by track number and by time. The Lingo script determines, by means of the command plug-in described above, at which track and time the play of the audio CD is. It then refers to the description in order to determine which frames of the animation correspond to that portion of the audio CD. If the current frame is not one of those frames, the Lingo script resets the time line of the animation so that the animation will begin to play at the frame which corresponds to the current position of the audio CD. This permits the visual content to catch up if it ever lags the CD, for example because downloading from the network has fallen behind, because the user's computer lacks the cycles to play the animation at full speed, or because the user has fast forwarded the CD.

Figure 2:
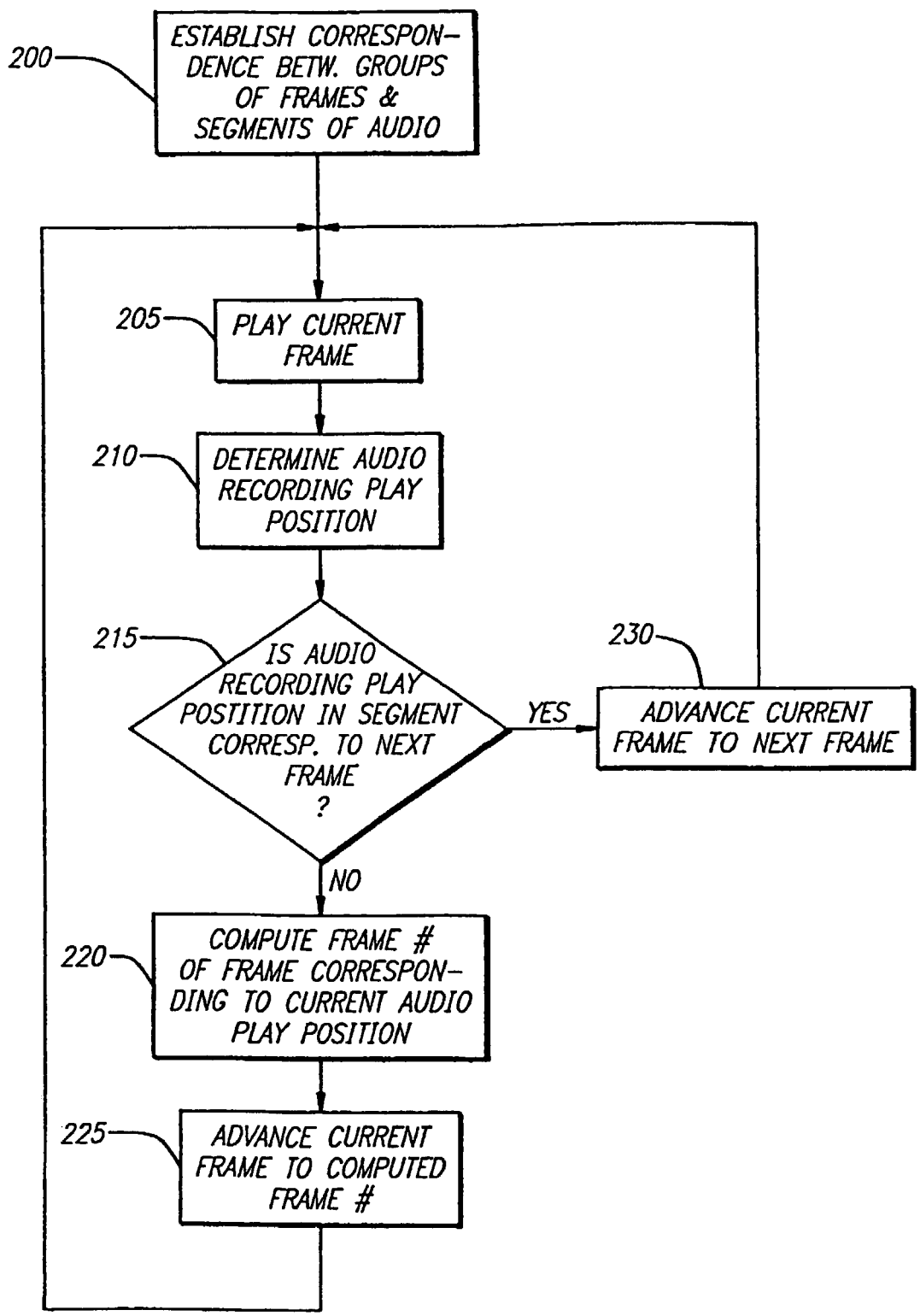
FIG. 2 is a flowchart of the synchronization code of the invention.

In a variant form of this synchronization algorithm (shown in FIG. 2), the frames of the animation are arranged into groups of contiguous frames. A correspondence is established between each such group of frames and a particular segment of the audio recording (box 200 in FIG. 2). After each frame of the animation is played (box 205), the audio play position is determined (box 210). A test is done to determine whether the audio play position is within the segment of the recording that corresponds to the group of frames to which the next sequential frame belongs (box 215). If the audio play position is within that segment, the playback of the animation proceeds with that next frame (box 230). If the audio play position is not within that segment, then the playback of the animation is advanced to the frame corresponding to where the audio is (boxes 220 and 225).

A further aspect of the invention is the ability, by making use of the command plug-in, to provide a technique for establishing a unique identifier for a recording which may be stored in mass storage, whether integrated circuit, magnetic (e.g., hard disk), or any other medium, or on a removable medium, such as an audio CD, or integrated circuit memory, such as compact flash memory, Memory Stick™, etc., accessed by a CD-ROM drive of a computer, MP3 player/recorder or any other device capable of accessing the medium. The unique identifier may be based on the number and lengths of the tracks (measured in frames, i.e., $1/75$ths of a second) from Table of Contents (TOC) data or the content of the recording itself. The identifier could simply be a concatenation of the track lengths that can be used with a fuzzy comparison algorithm and also for more precise matching if more than one possible match is located.

Following is an example of a fuzzy comparison algorithm that can be used with the present invention. For each of the two audio CDs to be compared, one determines the lengths of all the tracks in the recordings in milliseconds. One then shifts each of the track lengths to the right by eight bits, in effect performing a truncating division by $2^8=256$. One then goes through both of the recordings track by track, accumulating two numbers as one proceeds, the match total and the match error. These numbers are both initialized to zero at the start of the comparison. For each of the tracks, one increments the match total by the shifted length of that track in the first CD to be compared, and one increments the match error by the absolute value of the difference between the shifted lengths of the track in the two CDs. If one of the CDs has fewer tracks than the other, when one gets to the last track in the CD with fewer tracks, one continues with the tracks in the other CD, incrementing both the match total and the match error by the shifted lengths of the remaining tracks. Following these steps of going through the tracks, the algorithm then divides the match error by the match number, subtracts the resulting quotient from 1, and converts the difference to a percentage which is indicative of how well the two CDs match.

Use of track length to create an identifier for a recording is best suited to media that have multiple tracks and preferably those that store such information in a table of contents or TOC, such as CDs and DVDs. Furthermore, use of track length or TOC data has been found to work best with fuzzy matching, but this sometimes results in finding more than one possible match. An alternative or supplement for TOC data is to use the content of the recording. However, it is desirable to use a content-based identifier that is relatively small, to minimize storage space and bandwidth requirements.

Figure 4A:
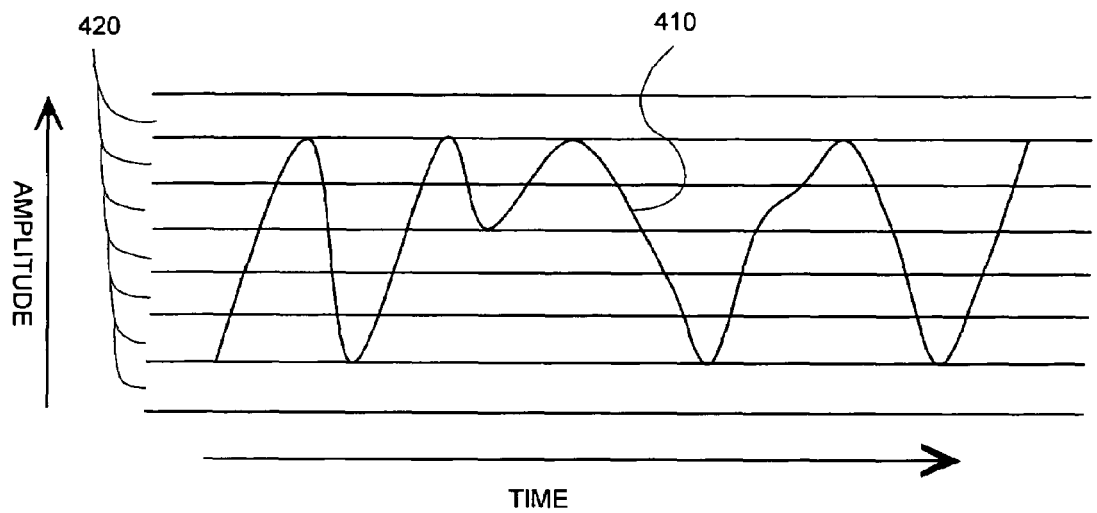
FIGS. 4A and 4B are explanatory diagrams of waveform analysis according to the present invention.
Figure 4B:
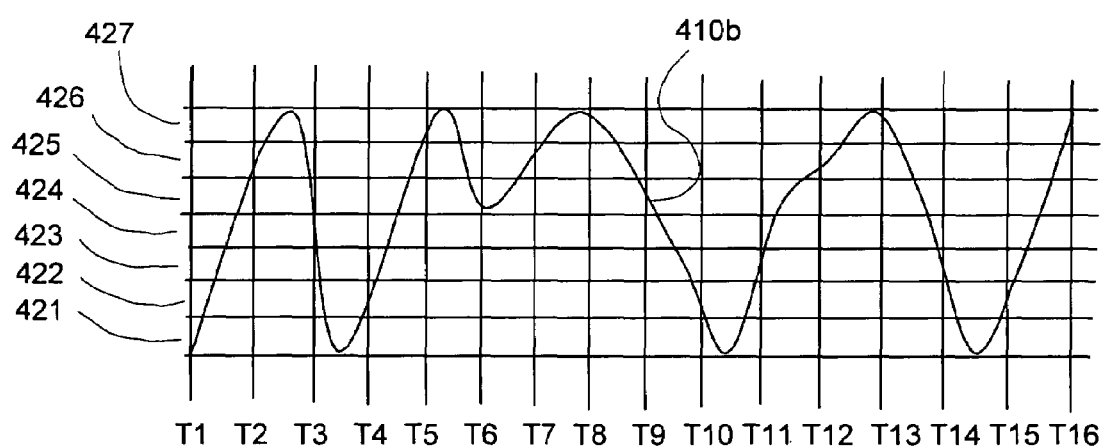

An embodiment of the present invention uses an amplitude signature providing a content-based identifier generated from short, e.g., five second sample segments from multiple locations in each track (if there is more than one track in a recording), such as the beginning, middle and end. An example of one such sample segment (the term sample segment is used to distinguish the segments used for generating the identifier from identified segments, i.e., segments identified in the TOC, that are commonly referred to as "tracks" on a CD) is illustrated in FIG. 4A with a waveform 410. According to the present invention, a plurality of amplitude bands or slots are defined and the number of occurrences of all segments of the waveform within each slot are counted. Redbook CD Audio is a sampled digital audio file of 44.1 K samples per channel, 16-bit stereo with 75 frames of data per second. Thus, there are a maximum of 220,500 occurrences in one five second sample segment (75 frames/sec*588 samples/frame*5 sec=220,500 samples in 5 seconds of data). To ensure uniqueness, it is desirable to use about 2000 (e.g., $2^{11}$ or 2048) slots, but other sizes, number and types of samples and number of slots can be used, depending on the characteristics of the waveforms being compared. To simplify the explanation of the invention, a coarser example will be given with respect to FIGS. 4A and 4B.

In the preferred embodiment, the first step is to normalize the waveform, so that the first and last slots have at least one occurrence of the waveform. The waveform 410 in FIG. 4A is normalized over the seven slots 420 illustrated in FIG. 4A to produce waveform 410*b* in FIG. 4B with the slots 420 separately indicated as slots 421–427. In the simplified example provided in FIG. 4B, 16 time samples are taken, one at each of the vertical lines. Thus, there is one sample of waveform 410b in slot 421, two in slot 422, three in slot 423, one in slot 424, two in slot 425, three in slot 426 and four in slot 427. This can be represented by the linear array A1 [1, 3, 2, 1, 2, 3, 4].

If the array A1 is an identifying signature array representing a selected recording for which a match in a database is sought, a fuzzy match may be accomplished by calculating an average of the difference between the elements of A1 and the elements of existing signature arrays. For example, one of the records in the database may have a signature array of A2 [2, 3, 4, 1, 1, 3, 3] for a difference array of [1, 0, 2, 0, 1, 0, 1] or an average difference of 5/7 or 0.714. A "fuzzy match" based on average difference allows for errors in the waveform and imperfect starting locations for the signature generation. However, the average difference that is accepted as a match should be set to minimize false positives. Alternatively, the number or length of the sample segments could be increased to reduce false positives, but this increases the time spent reading the recording and calculating the signature array. For the waveforms that have been tested, an average difference of 10 has been found able to find virtually all possible matches while eliminating a significant number of false positives when using CD waveforms and three sample segments of five seconds each with 2048 slots. Under these conditions it has been found that 256 slots produces too many matches of nonsimilar waveforms and 4000 slots leaves the slots so sparsely populated that there are a large number of near matches. The precise number of slots can be varied depending on the size of the sample segment(s) and the type of waveforms being sampled.

If more than one possible match has been found, more precise comparison of the identifying and existing signature arrays may be performed. The number of slots that match exactly or are within one occurrence of matching may be used. In the example given above, 6 out of 7 or 86% of the elements of arrays A1 and A2 match if an error of one (or one grace) is permitted and 3 out of 7 or 43% of the elements match precisely. It has been found that a better than 80% match for a one grace or a better than 70% match with no grace is likely to be an acceptable match. The grace value can be increased to more than one to allow more forgiveness in matching the waveforms.

A unique identifier for a musical recording may be employed as a database key. A site may maintain a database of information about CDs, for example information about all CDs issued by the particular record company can be maintained on that record company's site. There are various alternative ways for users to navigate this information. For example, they could use a Web page containing many hyperlinks as a table of contents, or they could use a conventional search engine. A third way of searching which is enabled by the unique identifier of the invention is for there to be Web page which invites the user to place in the computer's CD drive the CD about which he or she is seeking information. Upon detection of the presence of the CD in the drive, a script in the Web page computes the unique identifier corresponding to the CD and sends it to the server. The server then displays information about the CD retrieved from a database on the basis of that unique identifier. This information may include a Web address (URL) that is related to the audio CD (e.g., that of the artists' home page), simple data such as the names of the songs, and also complementary entertainment, including potentially photographs (e.g., of the band), artwork, animations, and video clips. It is also possible to arrange things so that, when the user inserts an audio CD into the computer, (i) the Web browser is launched if not already running, (ii) the browser computes the CD's unique identifier and from that unique identifier derives a URL, and (iii) the browser does an HTTP get transaction on that URL.

An alternative application of unique identifiers for musical recordings is to employ an audio CD as a key for entering into a premium area of the Web. There are presently premium areas of the Web to which people are admitted by subscription. A simple form of admission based on the unique identifier is to require, before accessing a particular area of the Web, that the user place in his or her CD drive a particular CD, or a CD published by a particular company or containing the music of a particular band or artist. This is readily accomplished by means of a script which invokes the functions provided by the command plug-in and computes a unique identifier.

A third aspect of the invention is the connection of chat rooms with musical recordings. The goal is to provide all participants in a chat room with the same music at approximately the same time.

The prevailing network protocol for chat services is Internet Relay Chat (IRC), described J. Oikarinen & D. Reed, Internet Relay Chat Protocol (Internet Request for Comments No. 1459, 1993). In this protocol, when one becomes a client of a chat server, one sends the name of a chat room. The chat server receives messages from all of its of clients and relays the messages sent in by one client to all the other clients connected in the same room as that client. The messages which a client sends are typically typed in by the user who is running the client, and the messages which a client receives are typically displayed for the user who is running the client to read.

Figure 3:
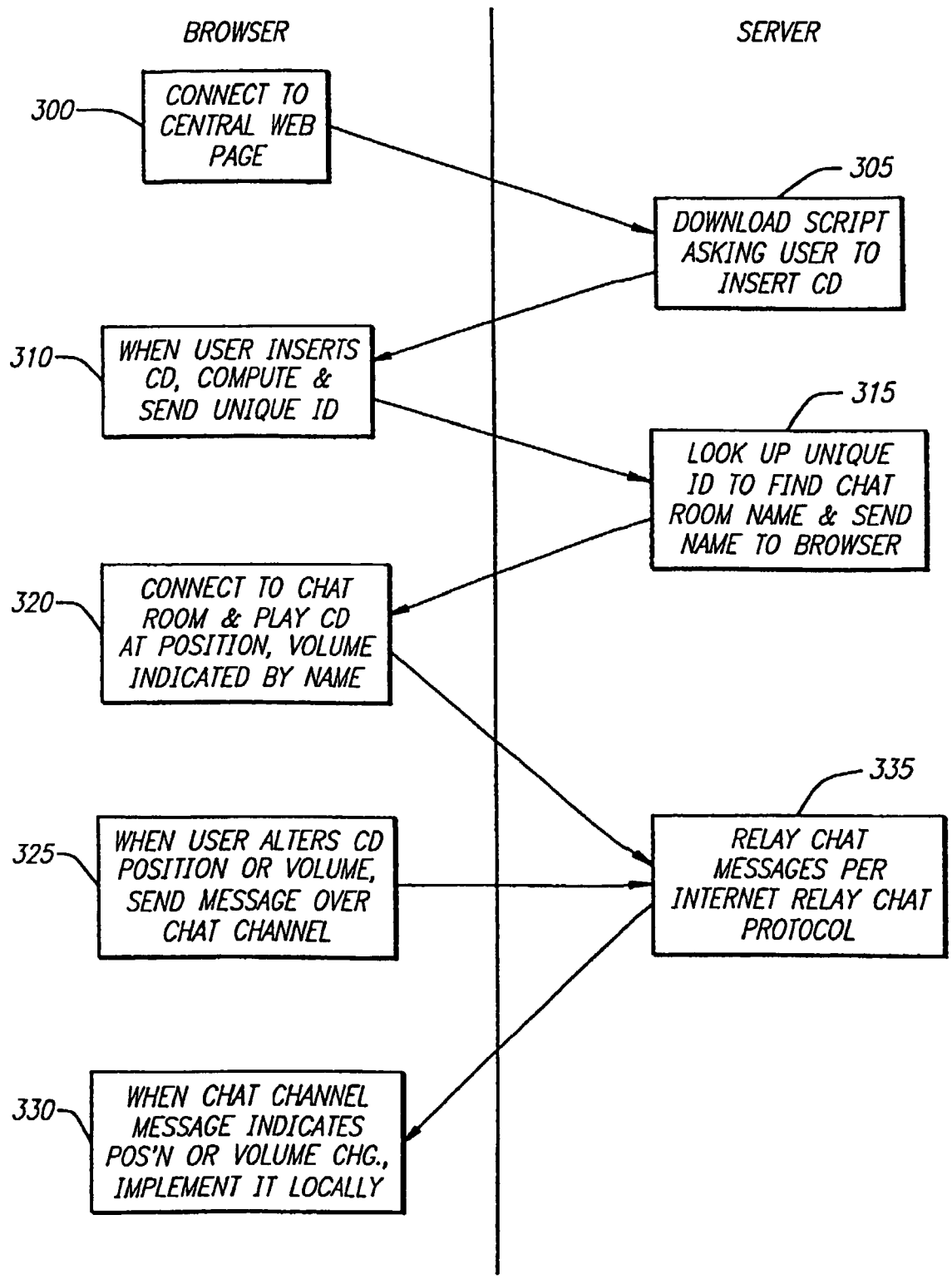
FIG. 3 is a flowchart of the sequence of operations for connection to a chat room focused on a musical recording.

In a preferred embodiment of the invention, a chat client is customized by means of a plug-in, which we will call the chat plug-in. The chat client is started up by a browser as follows (see FIG. 3). The user connects by means of the browser to a central Web page (box 300) which, upon being downloaded, asks that the user insert a CD into his or her player (box 305). A unique identifier of the CD is computed and communicated back to the server by using the control plug-in described above under the command of a script in the central Web page (box 310). The server then employs the unique identifier to determine whether it has a chat room focused on the CD (box 315). This step may be carried out by looking the unique identifier up in a database using techniques well known in the art. There exists a vast literature on connecting Web pages to databases, e.g., December & Ginsburg, supra, chapter 21. If a chat room focused on the CD exists or can be created, the server responds with the name of that chat room, and the browser starts up a chat client on the user's computer as a client of that chat room (box 320).

The chat room's name is set by the server to contain information about the track which the CD is playing in the other chat room clients' machines and the time at which the track started to play, as well as about the volume at which the CD is playing. The chat client plug-in employs that information to direct the control plug-in to set the CD in the user's computer to play in such a manner that it is approximately synchronized to the CD which is playing in the other chat room clients' machines (box 320).

Each user in the chat room is able to control the CD which is playing in his or her machine. Control actions result in the chat plug-in sending messages (box 335) to the chat server which describe the control action being taken (box 325). For example, such messages may indicate a change in the position of the CD, a change in the volume, or the ejection of the CD to replace it with another. The chat plug-ins running on the other users' machines, upon seeing a message of this kind, replicate the action (as far as possible) on the other users' machines by using the control plug-in described above (box 330).

In a further aspect of the invention, a chat room focused on a particular musical recording might allow for a voting procedure to select particular tracks. A simple voting procedure would be for each chat plug-in to act upon a change message of the kind described in the preceding paragraph only when it sees two identical consecutive change messages. This would mean that in order to change the track which is being played, it would be necessary for two users to change to that track. The number two may be replaced by a higher number.

In a further aspect of the invention the messages delivered to the users of a chat can be driven from a text file rather than manual typing. This would allow a pre-recorded experience to be played back for a group of chat users. Such a technique may be used to create a pre-recorded, narrated tour of an audio CD.

An important advantage of the preferred embodiment as described above is that it may be used with any chat server software which supports the minimal functionality required by Internet Relay Chat or by a protocol providing similar minimum chat service. The additional software required is located in the chat client plug-in and in the central Web page, with its connection to a database of CD information.

The many features and advantages of the present invention are apparent from the detailed specification and thus, it is intended by the appended claims to cover all such features and advantages of the system which fall within the true spirit and scope of the invention. Further, numerous modifications and changes will readily occur to those skilled in the art from the disclosure of this invention. It is not desired to limit the invention to the exact construction and operation illustrated and described; accordingly, suitable modification and equivalents may be resorted to, as falling within the scope and spirit of the invention.

What is claimed is:

1. A method of searching for a match in a database of a plurality of records, where the records in the database correspond to files, comprising:
   generating sample values for at least one portion of at least one selected file; and
   determining at least one matching record in the database for the at least one selected file based on the sample values and an indication of an amount of data in the at least one selected file.

2. A method as recited in claim 1, wherein the files may be used to play back at least one of audio and video,
   wherein said method further comprises calculating approximate playback times for the files represented by the records in the database and for the at least one selected file, and
   wherein said determining is based on the approximate playback times.

3. A method as recited in claim 1, wherein sampled digital data represent the recordings and the selected recording,
   wherein said method further comprises storing an existing signature array for each of the recordings represented in the database, where each element of the existing signature array corresponds to a number of occurrences of the sampled digital data within a value band in at least one segment of the recordings represented in the database, and
   wherein said generating produces an identifying signature array with each element of the identifying signature array corresponding to a number of occurrences of the sampled digital data within a value band in the at least one segment of the selected recording.

4. A method as recited in claim 3, wherein said determining includes
   calculating an average difference between the elements of the identifying signature array and the existing signature array for the recordings represented in the database; and
   identifying as a possible match any recording represented in the database for which the average difference is less than a predetermined value.

5. A method as recited in claim 1, further comprising outputting at least a portion of the at least one matching record.

6. A method of searching for a match in a database of a plurality of records, where the records in the database correspond to recordings having at least one track, comprising:
   generating sample values for at least one segment of a selected recording;
   calculating an approximate length of each track of each recording represented in the database and of the selected recording; and
   determining at least one matching record in the database for the selected recording based on the sample values and the number and length of tracks of the recordings represented in the database and the selected recording.

7. A method as recited in claim 6, wherein the recordings and the selected recording contain sampled digital data,
   wherein said method further comprises storing an existing signature array for each of the recordings represented in the database, where each element of the existing signature array corresponds to a number of occurrences of the sampled digital data within a value band in at least one segment of the recordings represented in the database, and
   wherein said generating produces an identifying signature array with each element of the identifying signature array corresponding to a number of occurrences of the sampled digital data within a value band in the at least one segment of the selected recording.

8. A method as recited in claim 7, wherein said determining includes
   calculating an average difference between the elements of the identifying signature array and the existing signature array for the recordings represented in the database; and
   identifying as a possible match any recording represented in the database for which the average difference is less than a predetermined value.

9. A method as recited in claim 7, wherein said determining includes
   calculating a matching percentage of corresponding elements in the identifying signature array and the existing signature arrays within a predetermined number of each other; and
   indicating as a possible match any recording represented in the database for which the matching percentage is greater than a predetermined percentage.

10. A method as recited in claim 9, wherein the predetermined number is zero and the predetermined percentage is substantially 70%.

11. A method as recited in claim 9, wherein the predetermined number is one and the predetermined percentage is substantially 80%.

12. A method as recited in claim 7, wherein the recordings are stored on removable storage media possessed by the user.

13. A method as recited in claim 7, wherein the recordings are digital files stored on mass storage accessible by a listener of the selected recording.

14. A method as recited in claim 6, further comprising receiving a query to search for a match between the selected recording and the records in the database, the query including the number of tracks and the length information for the selected recording.

15. A method as recited in claim 6, further comprising accessing at least one matching recording corresponding to the at least one matching record.

16. A method of searching for a match in a database of a plurality of records, where the records in the database correspond to files of sampled digital data, comprising:
storing an existing signature array for each of the files represented in the database, where each element of the existing signature array corresponds to a number of occurrences of the sampled digital data in at least one portion of the files represented in the database;
generating sample values for at least a portion of at least one selected file to produce an identifying signature array with each element of the identifying signature array corresponding to a number of occurrences of the sampled digital data in the at least one portion of the at least one selected file;
calculating a matching percentage of corresponding elements in the identifying signature array and the existing signature arrays within a predetermined number of each other; and
indicating as a possible match any of the files represented in the database for which the matching percentage is greater than a predetermined percentage.

17. A method as recited in claim 16, wherein the predetermined number is zero and the predetermined percentage is substantially 70%.

18. A method as recited in claim 16, wherein the predetermined number is one and the predetermined percentage is substantially 80%.

19. A method as recited in claim 16, wherein the files are stored on removable storage media possessed by the user.

20. A method as recited in claim 16, wherein the files are digital recordings stored on mass storage accessible by a listener of the at least one selected file.

21. A method of searching for a match in a database of a plurality of records, where the records in the database correspond to files of sampled digital data, comprising:
generating sample values for at least one portion of at least one selected file output to a user at a first location by user equipment;
generating a query based on the sample values, by the user equipment; and
sending the query from the user equipment to a server at a second location where the database is stored, to search for at least one matching record.

22. A method as recited in claim 21, further comprising sending from the server to the user equipment, additional information stored in the at least one approximately matching record and not included in the at least one selected file.

23. A database system, comprising:
a storage unit storing a database of records including existing sample values for recordings corresponding to the records; and
a processing unit, coupled to said storage unit, executing instructions that generate identifying sample values for a selected recording and determine at least one matching record in the database for the selected recording based on an indication of playback time of the selected recording and comparison of the identifying sample values with the existing sample values in the database.

24. A database system as recited in claim 23, wherein the recordings contain sampled digital data,
wherein said storage unit stores an existing signature array with each element corresponding to a number of occurrences of the sampled digital data within a value band in at least one segment of the recordings represented in the database, and
wherein said processing unit generates an identifying signature array with each element corresponding to a number of occurrences of the sampled digital data within a value band in at least one segment of the selected recording and determines the at least one matching record by calculating an average difference between the elements of the identifying signature array and the existing signature array for the recordings represented in the database and identifying as a possible match any recording represented in the database for which the average difference is less than a predetermined value.

25. A database system as recited in claim 23, wherein the recordings contain sampled digital data,
wherein said storage unit stores an existing signature array with each element corresponding to a number of occurrences of the sampled digital data within a value band in at least one segment of the recordings represented in the database, and
wherein said processing unit generates an identifying signature array with each element corresponding to a number of occurrences of the sampled digital data within a value band in at least one segment of the selected recording and determines the at least one matching record by calculating a matching percentage of corresponding elements in the identifying signature array and the existing signature arrays within a predetermined number of each other and indicating as a possible match any recording represented in the database for which the matching percentage is greater than a predetermined percentage.

26. A database system, comprising:
a storage unit storing a database of records including existing sample values for recordings corresponding to the records and information indicating length and number of identified segments of the recordings; and
a processing unit, coupled to said storage unit, executing instructions that generate identifying sample values and approximate length information for a selected recording and determine at least one matching record in the database for the selected recording based on a comparison of the identifying sample values with the existing sample values in the database, and the approximate length information and a number of identified segments in the selected recording and the recordings corresponding to the records in the database.

27. A database system, comprising:
a storage unit storing a database of records including existing sample values for recordings corresponding to the records;
a communication unit, coupled to said storage unit, to receive a query to search for a match between a selected recording and the records in the database, the query including the number of segments and the length information for the selected recording; and
a processing unit, coupled to said storage unit, executing instructions that generate identifying sample values for a selected recording and determine at least one matching record in the database for the selected recording by comparing the identifying sample values with the existing sample values in the database.

28. A database system as recited in claim 27, wherein the recordings corresponding to the records in the database and the selected recording each contain at least an audio portion and the number of segments are the number of tracks in the audio portion.

29. A database system as recited in claim 28, wherein the recordings are stored on removable storage media possessed by the user.

30. A database system as recited in claim 28, wherein the recordings are digital files stored on mass storage accessible by a listener of the selected recording.

31. A database system as recited in claim 27,
wherein said processing unit, storage unit and communication unit are at a first location, and
wherein said database system further comprises:
equipment possessed by a user at a second location, remote from the first location, to generate the query and play the selected recording; and
a communication network coupling said equipment and said communication unit at least for sufficient time to send the query from said equipment to said communication unit.

32. A database system as recited in claim 31, wherein said communication unit sends to the equipment via said communication network additional information stored in the at least one approximately matching record and not included in the selected recording.

33. A computer implemented method stored on a computer-readable medium with executable instructions to perform searching for a match in a database of a plurality of records, where the records in the database correspond to files storing at least audio, comprising:
generating sampled values for at least one segment of at least one selected file; and
determining at least one matching record in the database for the at least one selected file based on the sampled values and an indication of an amount of data in the at least one selected file.

34. A computer implemented method as recited in claim 33,
wherein the method further comprises calculating approximate playback times for the files represented by the records in the database and for the at least one selected file, and
wherein said determining is also based on the approximate playback times.

35. A computer implemented method as recited in claim 33, wherein sampled digital data represent the recordings and the selected recording,
wherein said method further comprises storing an existing signature array for each of the recordings represented in the database, where each element of the existing signature array corresponds to a number of occurrences of the sampled digital data within a value band in at least one segment of the recordings represented in the database, and
wherein said generating produces an identifying signature array with each element of the identifying signature array corresponding to a number of occurrences of the sampled digital data within a value band in the at least one segment of the selected recording.

36. A computer implemented method as recited in claim 35, wherein said determining includes
calculating an average difference between the elements of the identifying signature array and the existing signature array for the recordings represented in the database; and
identifying as a possible match any recording represented in the database for which the average difference is less than a predetermined value.

37. A computer implemented method as recited in claim 35, wherein said determining includes
calculating a matching percentage of corresponding elements in the identifying signature array and the existing signature arrays within a predetermined number of each other; and
indicating as a possible match any recording represented in the database for which the matching percentage is greater than a predetermined percentage.

38. A computer implemented method as recited in claim 35, wherein the recordings are stored on removable storage media possessed by the user.

39. A computer implemented method as recited in claim 38, wherein the recordings are digital files stored on mass storage accessible by a listener of the selected recording.

40. A computer implemented method as recited in claim 35,
wherein the selected recording is played at a first location on equipment possessed by a user, and
wherein said method further comprises:
generating a query by the equipment at the first location; and
sending the query to a server at a second location where the database is stored, to search for at least one matching record.

41. A computer implemented method as recited in claim 40, further comprising sending from the server to the equipment at the first location additional information stored in the at least one approximately matching record and not included in the selected recording.

42. A computer implemented method stored on a computer-readable medium with executable instructions to perform searching for a match in a database of a plurality of records, where the records in the database correspond to recordings of at least audio and having at least one track, comprising:
generating sample values for at least one segment of a selected recording;
calculating an approximate length of each track of each recording represented in the database and of the selected recording; and
determining at least one matching record in the database for the selected recording based on the sample values and the number and length of tracks of the recordings represented in the database and the selected recording.

43. A computer implemented method as recited in claim 42, wherein sampled digital data represent the recordings and the selected recording, wherein said method further comprises storing an existing signature array for each of the recordings represented in the database, where each element of the existing signature array corresponds to a number of occurrences of the sampled digital data within a value band in at least one segment of the recordings represented in the database, and wherein said generating produces an identifying signature array with each element of the identifying signature array corresponding to a number of occurrences of the sampled digital data within a value band in the at least one segment of the selected recording.

44. A computer implemented method as recited in claim 43, wherein said determining includes calculating an average difference between the elements of the identifying signature array and the existing signature array for the recordings represented in the database; and identifying as a possible match any recording represented in the database for which the average difference is less than a predetermined value.

45. A computer implemented method as recited in claim 43, wherein said determining includes calculating a matching percentage of corresponding elements in the identifying signature array and the existing signature arrays within a predetermined number of each other; and indicating as a possible match any recording represented in the database for which the matching percentage is greater than a predetermined percentage.

46. A computer implemented method as recited in claim 43, wherein the recordings are stored on removable storage media possessed by the user.

47. A computer implemented method as recited in claim 43, wherein the recordings are digital files stored on mass storage accessible by a listener of the selected recording.

48. A computer implemented method as recited in claim 42, further comprising receiving a query to search for a match between the selected recording and the records in the database, the query including the number of tracks and the length information for the selected recording.

* * * * *